(12) United States Patent
Hunt

(10) Patent No.: US 12,144,459 B2
(45) Date of Patent: *Nov. 19, 2024

(54) CHAFER SKIRT

(71) Applicant: Robert Leander Hunt, Bowie, MD (US)

(72) Inventor: Robert Leander Hunt, Bowie, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,383

(22) Filed: Aug. 27, 2021

(65) Prior Publication Data

US 2022/0192420 A1  Jun. 23, 2022

Related U.S. Application Data

(60) Provisional application No. 63/128,510, filed on Dec. 21, 2020.

(51) Int. Cl.
*A47J 36/24* (2006.01)

(52) U.S. Cl.
CPC ....... *A47J 36/2405* (2013.01); *A47J 36/2477* (2013.01)

(58) Field of Classification Search
CPC .... A47J 36/2405; A47J 36/2477; A47J 47/16; A47J 36/34; A47J 27/10; A47J 36/26; A47J 36/36
USPC ............................................ 99/339, 449, 483
See application file for complete search history.

(56) References Cited

U.S. PATENT DOCUMENTS

| 5,881,637 A * | 3/1999 | Strickel .................... A62C 8/06 D7/366 |
| 2014/0305955 A1* | 10/2014 | Lee .......................... A47J 36/36 220/739 |

* cited by examiner

*Primary Examiner* — Phuong T Nguyen
(74) *Attorney, Agent, or Firm* — THE LAW FIRM OF ANDREA HENCE EVANS, LLC

(57) ABSTRACT

A chafer device is provided to offer protection against wind, helping keep sterno burners from being extinguished so that food can be kept warm. The present invention provides a chafer device that comprises a skirt member and an attachment member. The skirt member is removably attached to a top perimeter of a chafing dish frame via the attachment member. The skirt member wraps around the chafing dish frame and extends downward from the top perimeter of the chafing dish frame to form a wall around the chafing dish frame, thereby enclosing a heat source below the chafing dish frame.

6 Claims, 5 Drawing Sheets

CHAFER SKIRT

The current application claims a priority to the U.S. provisional patent application Ser. No. 63/128,510 filed on Dec. 21, 2020.

FIELD OF THE INVENTION

The present invention generally relates to a chafer skirt. More specifically, the present invention relates to a chafer skirt that provides child and weather protection while ensuring uniformity and constancy of flames in a chafing dish.

BACKGROUND OF THE INVENTION

A chafer skirt that provides efficient safety protection while ensuring constant flaming in a chafing dish is in demand.

Food service health standards require that hot foods be maintained at specific temperatures. To meet these standards, consumers use portable chafers fueled by denatured alcohol. This method works well in ideal conditions but is often less than ideal for outdoor use.

A chafing dish is a piece of equipment that is used in the food industry, including in restaurants that specialize in buffets with hot dishes. Chafing dishes (a.k.a. chafers) keep food warm and are a convenient way of heating buffet items.

Chafing dishes are in widespread use as a utensil for heating a variety of food products. Various styles and designs of chafers are available on the market. Some traditional chafing dishes use conventional gel or liquid fuel to offer an inexpensive and simple buffet heating solution. Various conventional chafing dishes are well designed for heating food items, but many of them have limitations, including the inability to uniformly heat food.

Temperature variance in chafing dishes can cause food to dry out or burn in some areas, potentially degrading the overall appeal of the food. Furthermore, if the food held in a chafing dish becomes too hot or cold, its heat cannot be easily adjusted using a conventional chafing dish.

Companies have introduced various chafer skirts that are intended to solve these temperature problems, but they are not designed to provide safety protection and are sometimes inconvenient to install. Thus, there is a need to develop a device that solves these problems.

The present invention is intended to address problems associated with and/or otherwise improve on conventional devices through an innovative chafer skirt device that is designed to be convenient, effective, and inexpensive to install on chafers while offering weather and child safety protection and incorporating other problem-solving features.

SUMMARY

In accordance with the present invention, a novel chafer device is provided that requires a skirt member and an attachment member. The skirt member is removably attached to a top perimeter of a chafing dish frame via the attachment member. The skirt member wraps around the chafing dish frame and extends downward from the top perimeter of the chafing dish frame to form a wall around the chafing dish frame.

The present invention is made of a flame-retardant elastic material and designed to offer protection against wind, helping keep sterno burners from being extinguished so that food can be kept warm.

In one embodiment, the skirt member of the present invention may include an adjustment mechanism, which may include folding parts suitably placed.

In another embodiment, the attachment member can be attached to the edges of the skirt member using any suitable means.

The present invention can be easily installed on a chafing dish frame and this easy installation with an adjustment mechanism is one of the significant advantages compared with conventional devices.

DETAIL DESCRIPTIONS OF THE INVENTION

All illustrations of the drawings are for the purpose of describing selected versions of the present invention and are not intended to limit the scope of the present invention.

As shown in FIGS. 1 to 5, the present invention provides a chafer device 100 that comprises a skirt member 10.

The skirt member 10 can be designed to offer protection against wind, helping keep sterno burners from being extinguished so that food can be kept warm.

The skirt member 10 can be of any size and material suitable for providing protection from wind and unexpected child behaviors. Such a suitable material can be any flame-retardant elastic material, including Spandex, flame-retardant polyester blends, and any other types of stretchy flame-retardant fabrics that can offer protection from the elements, ensuring adherence to food safety standards by keeping flames constant while providing child protection and safety by shielding open sterno flames.

Figure 5:
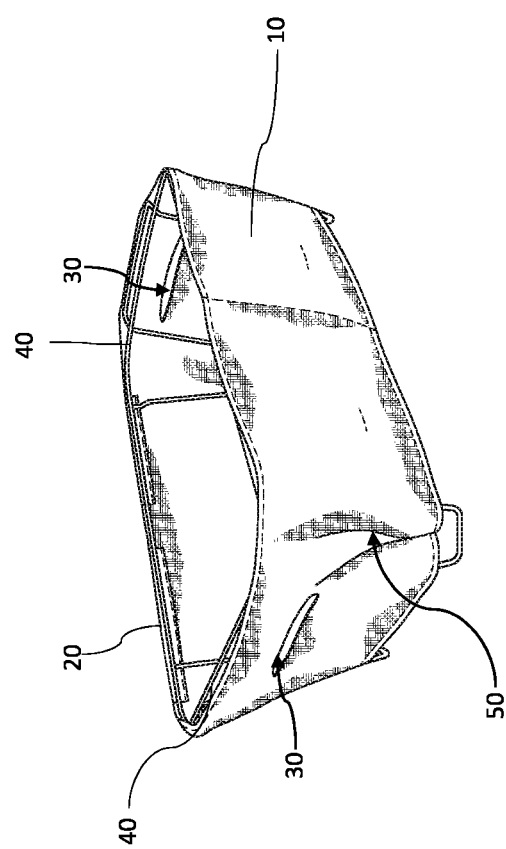
FIG. 5 is an illustration of one embodiment of the present invention installed on a chafing dish frame.

The skirt member 10 can be a sheet that wraps around the chafing dish frame 40, as shown in FIG. 5. The surface of the sheet can be extended downward from the top to form a wall around one or more sides of the chafing dish frame 40, enclosing the heat sources below the chafing dish frame 40.

In some embodiments, the two opposing edges of the sheet can be securely attached to form a chafer device with openings through which the chafing dish frame 40 can be pushed to install the present invention.

In some embodiments, the skirt member 10 can be sized and designed to fit wire chafing dish frames 40. The size and design of the skirt member 10 can be made so that the chafer device 100 of the present invention is portable, including in a design usable for commercial and consumer events.

Figure 1:
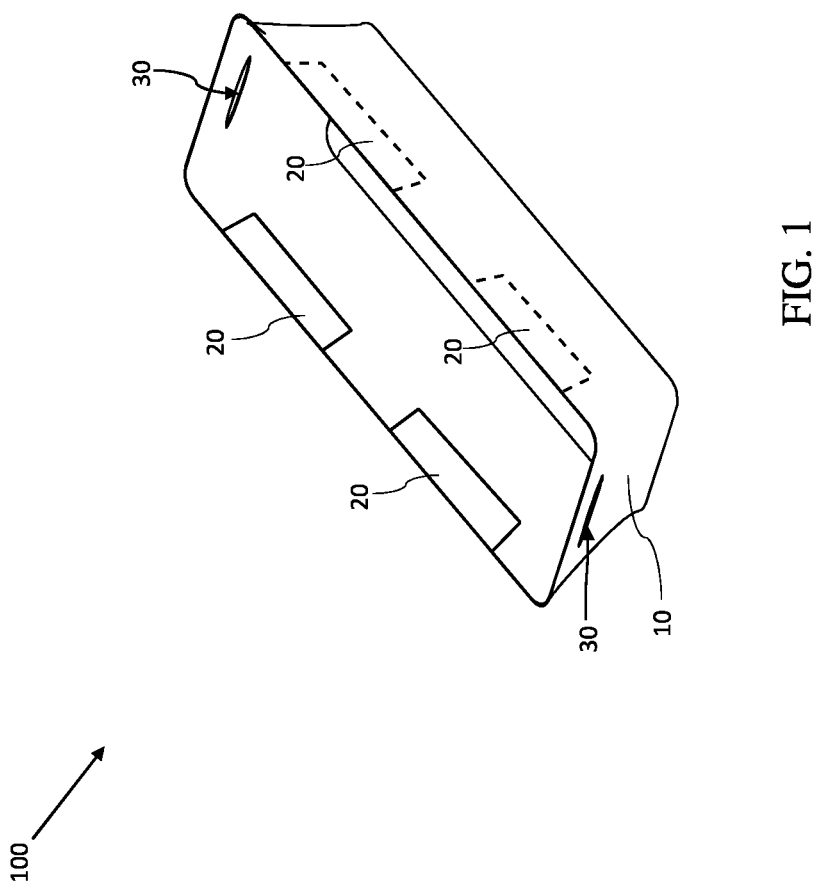
FIG. 1 is an illustration of one embodiment of the present invention.
Figure 2:
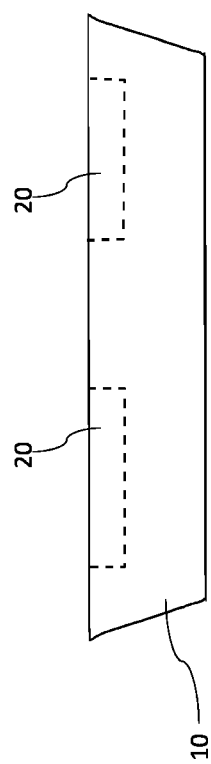
FIG. 2 is a side view of one embodiment of the present invention.
Figure 3:
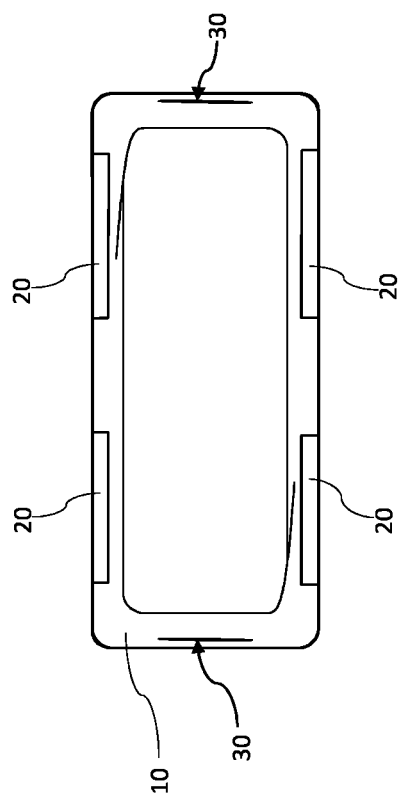
FIG. 3 is a top view of one embodiment of the present invention.
Figure 4:
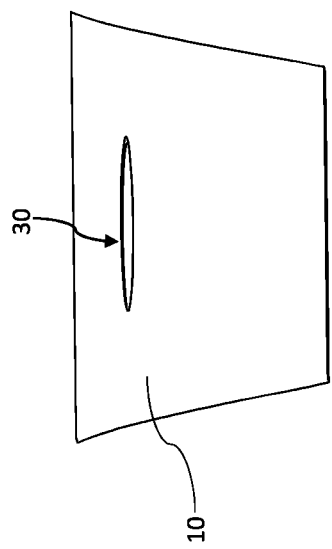
FIG. 4 is a front view of one embodiment of the present invention.

In some embodiments, the skirt member 10 can include one or more slots 30 that can be used to hold the chafer device 100 by hand, as shown in FIG. 4 and FIG. 5.

In preferred embodiments, the chafer device 100 is configured to surround and removably secure to a chafer dish frame so as to keep heat retained under a chafer dish being held by the chafing dish frame 40.

In some embodiments, the skirt member 10 may include an attachment member 20 that can be used to attach the skirt member 10 tightly to the perimeter of a chafing dish frame 40. In one embodiment, the attachment member 20 can be attached to the body of the skirt member 10 along the edges.

The attachment member 20 can be tie straps or elastic. The length of the attachment member 20 may be long enough to accommodate chafing dish frames 40 of variable size.

In some embodiments, the attachment member 20 can be attached to the edges of the skirt member 10 using any suitable means, whether glue stamping, conventional ultrasonic bonding, sewing, thermal binding, or perforated binding.

In some embodiments, the skirt member 10 may include an adjustment mechanism, which may include folding parts 50 suitably placed. For example, when the chafer device 100 is installed in a rectangular chafing dish frame 40, as shown in FIG. 5, the corners of the skirt member 10 can be folded with a corner fastener to tightly attach the skirt member 10 to the rectangular chafing dish frame 40. The corner fastener may include various fasteners, including but not limited to a hook-and-loop-type fastener, snaps, buttons, and one or more clamps.

Although the invention has been explained in relation to its preferred embodiment, it is to be understood that many other possible modifications and variations can be made without departing from the spirit and scope of the invention.

What is claimed is:

1. A chafer device comprising:
   a skirt member comprising an elastic material, the skirt member having a sheet made from the elastic material with two opposing edges securely attached together;
   an attachment member attached to the sheet;
   wherein the skirt member includes a plurality of folding parts and is removably attached to a top perimeter of a chafing dish frame via the attachment member;
   wherein the skirt member wraps around the chafing dish frame and extends downward from the top perimeter of the chafing dish frame to form a wall around the chafing dish frame, thereby enclosing a heat source below the chafing dish frame;
   wherein the skirt member further comprises two apertures configured to receive two chafing dish handle arms on opposing sides such that the positioning of said apertures further causes the skirt member to tightly attach to the edges of the chafing dish and the chafing dish frame; and
   a plurality of corner fasteners placed on each corner of the skirt member to tightly attach the skirt member to the chafing dish frame.

2. The chafer device as claimed in claim 1, wherein the elastic material is made from at least one of: a flame-retardant elastic material, spandex material, flame-retardant polyester blends, and other stretchy flame-retardant fabrics.

3. The chafer device as claimed in claim 1, wherein the corner fastener is a button.

4. The chafer device as claimed in claim 1, wherein the corner fastener is a snap fastener.

5. The chafer device as claimed in claim 1, wherein the sheet skirt member two apertures includes one or more slots.

6. A wind resistant, fire retardant, chafer safety skirt device comprising:
   a skirt member comprising an elastic material, the skirt member having a sheet made from the elastic material with two opposing edges securely attached together;
   wherein the elastic material is made from at least one of: a flame-retardant elastic material, spandex material, flame-retardant polyester blends, and other stretchy flame-retardant fabrics;
   an attachment member attached to the sheet;
   wherein the skirt member includes a plurality of folding parts and is removably attached to a top perimeter of a chafing dish frame via the attachment member;
   wherein the skirt member wraps around the chafing dish frame and extends downward from the top perimeter of the chafing dish frame to form a wall around the chafing dish frame, thereby enclosing a heat source below the chafing dish frame;
   wherein the skirt member further comprises two apertures configured to receive two chafing dish handle arms on opposing sides such that the positioning of said apertures further causes the skirt member to tightly attach to the edges of the chafing dish and the chafing dish frame; and
   a plurality of corner fasteners placed on each corner of the skirt member to tightly attach the skirt member to the chafing dish frame.

* * * * *